Patented Apr. 25, 1933

1,905,374

UNITED STATES PATENT OFFICE

FRIEDRICH FELIX AND WILHELM HUBER, OF BASEL, SWITZERLAND, ASSIGNORS TO SOCIETY OF CHEMICAL INDUSTRY IN BASLE, OF BASEL, SWITZERLAND

AZO-DYESTUFFS AND PROCESS OF MAKING SAME

No Drawing. Application filed November 30, 1932, Serial No. 645,134, and in Switzerland December 21, 1931.

The present invention relates to the manufacture of new azo-dyestuffs. It comprises the process of making these azo-dyestuffs, and the azo-dyestuffs themselves.

According to this invention esters and ethers of cellulose, particularly acetate silk, are dyed fast tints by dyestuffs made by causing an aromatic diazo-compound of the benzene series, which contains no substituents capable of bringing about solubility in dilute aqueous caustic alkalies, such as for example the sulfonic acid, hydroxyl-, carboxyl-, sulfamide-group, etc., to act on 1-amino-3-hydroxybenzene in such media the pH of which is not greater than 7 so that the coupling occurs in 4-position, and subsequently acylating the dyestuff thus produced with acylating agents which introduce the residue of an aliphathic carboxlyic acid of low molecular weight, such as formic acid, acetic anhydride or acetyl chloride, proprionic anhydride, ethyl- or methyl-ester of chloro-formic acid, or a cyanate.

The dyestuffs, which correspond very probably to the general formula

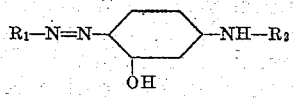

in which $R_1$ means a benzene nucleus which contains no substituents capable of bringing about solubility in dilute aqueous caustic alkalies, such as for example the sulfonic acid-, hydroxyl-, carboxyl-, sulfamide-group etc., and $R_2$ the residue of an aliphathic carboxylic acid of low molecular weight, constitute yellow to red powders which dissolve in organic solvents, such as acetic ester, to yellow to orange solutions, and dye the said materials greenish-yellow to orange tints. Products which dye yellow and green yellow are obtained by coupling a diazotized aromatic base, such as an aniline, a toluidine, an anisidine, a cresidine or a chloraniline, and subsequently acylating the dyestuff obtained. These dyestuffs have in particular the property that they may be used with advantage for producing grey and green tints, as such dyeings are not phototropic. Moreover, these dyestuffs are characterized by the very good fastness to light exhibited by their dyeings. For orange dyeings there are used dyestuffs of this kind which contain a nitro-group in the diazo-component.

For dyeing textiles the dyestuffs which are sparingly soluble or insoluble are preferably used in finely subdivided form, to which end they are ground with a dispersing agent, such as the sulfonated residues obtained in the manufacture of benzaldehyde or turpentine oil, in the presence of water to form a fine paste. These pastes can be used for dyeing or they may be converted into preparations capable of being powdered by cautiously drying them, preferably in a vacuum, at a temperature not too high in the presence of further quantities of the said agent or other auxiliary materials, such as sulfite cellulose waste liquor. For dyeing natural or artificial resins, lacquers or varnishes, for instance nitrocellulose lacquer, the new dyestuffs are preferably used in a pure condition.

The following examples illustrate the invention, the parts being by weight:—

Example 1

93 parts of aniline are dissolved in 1500 parts of water and 250 parts of hydrochloric acid of 30 per cent. strength. 500 parts of ice are added and the solution is diazotized by means of 70 parts of sodium nitrite. The diazo-solution is neutralized with 136 parts of crystallized sodium acetate and then there are introduced 109 parts of meta-aminophenol. When coupling is complete the whole is filtered.

189 parts of this dyestuff are heated to 100° C. for ¼ hour with 102 parts of acetic anhydride. The acetic acid is then distilled under reduced pressure. The residue constitutes the new dyestuff which, if necessary after recrystallization from glacial acetic acid, is a dark yellow powder soluble in organic solvents, such as alcohol or ethylacetate to a yellow solution and capable of dyeing acetate silk very fast greenish-yellow tints which are not phototropic. The formula of the new dyestuff is very probably

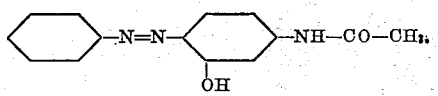

*Example 2*

123 parts of para-anisidine are dissolved in 1500 parts of water and 250 parts of hydrochloric acid of 30 per cent. strength. To the solution are added 500 parts of ice and it is then diazotized by means of 70 parts of sodium nitrite. The diazo-solution is neutralized with 136 parts of crystallized sodium acetate and 109 parts of meta-aminophenol are added. When coupling is complete the dyestuff is filtered and acetylated as described in Example 1. There is thus obtained a dyestuff which corresponds very probably to the formula

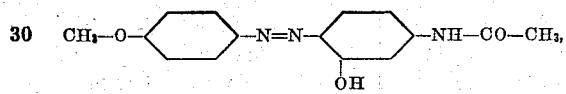

and dyes intensely green-yellow tints which are very fast to light.

*Example 3*

4-5 parts of the dyestuff described in Example 2 are dissolved in 1000 parts of nitrocellulose lacquer. The liquid thus obtained, when spread in thin layers on various supports (metal, glass, leather, wood, celluloid, silk or the like), yields when dry a transparent coating having an intensely green-yellow color fast to light. By incorporating suitable added materials a transparent lacquer may be converted into a matt lacquer or covering lacquer.

*Example 4*

10 parts of the dyestuff described in Example 2, which have been acetylated by means of acetic acid anhydride, are stirred with the addition of a suitable dispersing agent, such as Turkey red oil, sulfite cellulose waste liquor or a sulfonation product of the residue of the manufacture of benzaldehyde so as to form a uniform paste containing 20 per cent. of dyestuff. One part of this paste is very intimately mixed with 10 parts of water of 50° C. and such a quantity of concentrated soap solution that the dyebath to be made from the mixture will correspond with a soap solution of 2 per mille strength. The whole is diluted to make 300 parts. Into the emulsion thus prepared are entered 10 parts of acetate silk yarn. The bath is heated with ¾ hour to 75° C. and dyeing is continued for about ¼ hour at this temperature. Rinsing and brightening follow. There are obtained, intense, vivid, green-yellow dyeings having very good properties of fastness.

What we claim is:—

1. A process for the manufacture of azo-dyestuffs, consisting in coupling diazo-compounds of the benzene series, which contain no substituents capable of bringing about solubility in dilute aqueous caustic alkalies, with 1-amino-3-hydroxybenzene in such media the pH of which is not greater than 7, and treating the dyestuffs thus obtained with such acylating agents which introduce the residue of an aliphatic carboxylic acid of low molecular weight.

2. A process for the manufacture of azo-dyestuffs, consisting in coupling diazo-compounds of the general formula

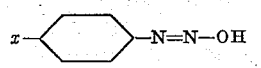

in which $x$ stands for H or O-alkyl, with 1-amino-3-hydroxy-benzene in such media the pH of which is not greater than 7, and treating the dyestuffs thus obtained with such acylating agents which introduce the residue of an aliphatic carboxylic acid of low molecular weight.

3. A process for the manufacture of azo-dyestuffs, consisting in coupling diazo-compounds of the general formula

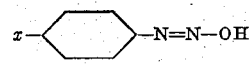

in which $x$ stands for H or O-alkyl, with 1-amino-3-hydroxy-benzene in such media the pH of which is not greater than 7, and treating the dyestuffs thus obtained with acetic anhydride.

4. A process for the manufacture of an azo-dyestuff, consisting in coupling 1-diazo-4-methoxy benzene with 1-amino-3-hydroxy-benzene in such a medium the pH of which is not greater than 7, and treating the dyestuff thus obtained with acetic anhydride.

5. The dyestuffs of the general formula

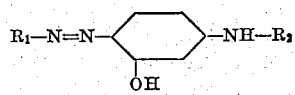

wherein $R_1$ means a benzene nucleus which contains no substituents capable of bringing about solubility in dilute aqueous caustic alkalies, and $R_2$ the residue of an aliphatic carboxylic acid of low molecular weight, which products constitute yellow to red powders which dissolve in acetic ester to yellow to orange solutions, and dye acetate silk in aqueous suspensions fast yellow to orange tints.

6. The dyestuffs of the general formula

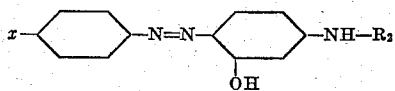

wherein $x$ means H or O-alkyl, and $R_2$ the residue of an aliphatic carboxylic acid of low molecular weight, which products constitute yellow powders which dissolve in acetic ester to yellow solutions, and dye acetate silk in aqueous suspensions fast yellow tints.

7. The dyestuffs of the general formula

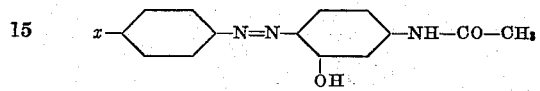

wherein $x$ means H or O-alkyl, which products constitute yellow powders which dissolve in acetic ester to yellow solutions, and dye acetate silk in aqueous suspensions fast yellow tints.

8. The dyestuff of the formula

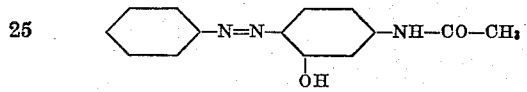

which product constitutes a yellow powder which dissolves in acetic ester to a yellow solution, and dyes acetate silk in an aqueous suspension fast yellow tints.

9. The dyestuff of the formula

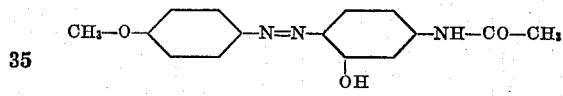

which product constitutes a yellow powder which dissolves in acetic ester to a yellow solution, and dyes acetate silk in an aqueous suspension fast yellow tints.

In witness whereof we have hereunto signed our names this 21st day of November 1932.

FRIEDRICH FELIX
WILHELM HUBER.